United States Patent [19]

Dombrowski et al.

[11] Patent Number: 5,010,688
[45] Date of Patent: Apr. 30, 1991

[54] GARAGE DOOR OPERATOR WITH PLASTIC DRIVE BELT

[75] Inventors: Kenneth J. Dombrowski, Wheaton; Joseph Ergun, Itasca, both of Ill.

[73] Assignee: The Chamberlain Group, Inc., Elmhurst, Ill.

[21] Appl. No.: 516,662

[22] Filed: Apr. 30, 1990

[51] Int. Cl.$^5$ .................... E05F 15/16; F16H 19/06
[52] U.S. Cl. .................... 49/362; 24/31 R; 24/265 R; 49/200; 74/89.21; 160/189; 474/144
[58] Field of Search ............ 49/360, 362, 199, 200; 74/89.21; 160/189, 188, 201; 24/265 R, 31 R, 37; 474/144, 151, 210

[56] References Cited

U.S. PATENT DOCUMENTS

| | | | |
|---|---|---|---|
| 2,084,733 | 1/1937 | Kahliff | 268/59 |
| 3,683,710 | 8/1972 | MacFarland | 74/89.21 |
| 3,722,141 | 3/1973 | Miller | 49/139 |
| 4,114,473 | 9/1978 | Pollak | 74/611 |
| 4,231,191 | 11/1980 | Ellmore | 49/28 |
| 4,330,960 | 5/1982 | Hasemann et al. | 49/404 |
| 4,422,396 | 12/1983 | Szostak | 112/261 |
| 4,648,855 | 3/1987 | Palloch et al. | 474/144 |
| 4,885,872 | 12/1989 | Chang et al. | 49/362 |
| 4,912,812 | 4/1990 | Henn et al. | 24/31 R |

OTHER PUBLICATIONS

The Sears Best/Craftsman Owners Manual Garage Door Opener, 1988.
The DISOGRIN catalog.
Bernal catalog (in German) Garagentorantriebe Ferngesteuert.

Primary Examiner—Allan D. Herrmann
Assistant Examiner—David W. Laub
Attorney, Agent, or Firm—Fitch, Even, Tabin & Flannery

[57] ABSTRACT

A garage door operator for moving a garage door between open and closed posiitons includes a head unit for being held by a support structure positioned remote from the door with the head unit having a motor and a drive wheel with spaced teeth on its periphery for being driven by the motor. The operator also includes an elongate rail having a first end which is held by a support structure disposed adjacent and above the door with the rail including a pulley located adjacent the first end. The rail also includes a second end for being held adjacent to and in alignment with the drive wheel. The operator also includes a drive belt assembly for training about the drive wheel and the pulley and for being supported by the rail. The belt assembly includes a length of a plastic belt with teeth on one surface thereof matching the teeth on the drive wheel. The belt further assembly further includes a trolley for connection to the garage door and a first connector for joining one of the plastic belt to one end of the trolley. The connector includes a belt clip including a pair of spaced, aligned side walls with one side wall having an inside surface with undulations corresponding to the teeth of the plastic belt. The connector further includes a clip holder deformable from an as-formed position in which the holder can receive the side walls flanking the belt with the belt teeth aligned with the undulations, to a deformed position in which the holder firmly holds the side walls with the belt positioned therebetween.

15 Claims, 5 Drawing Sheets

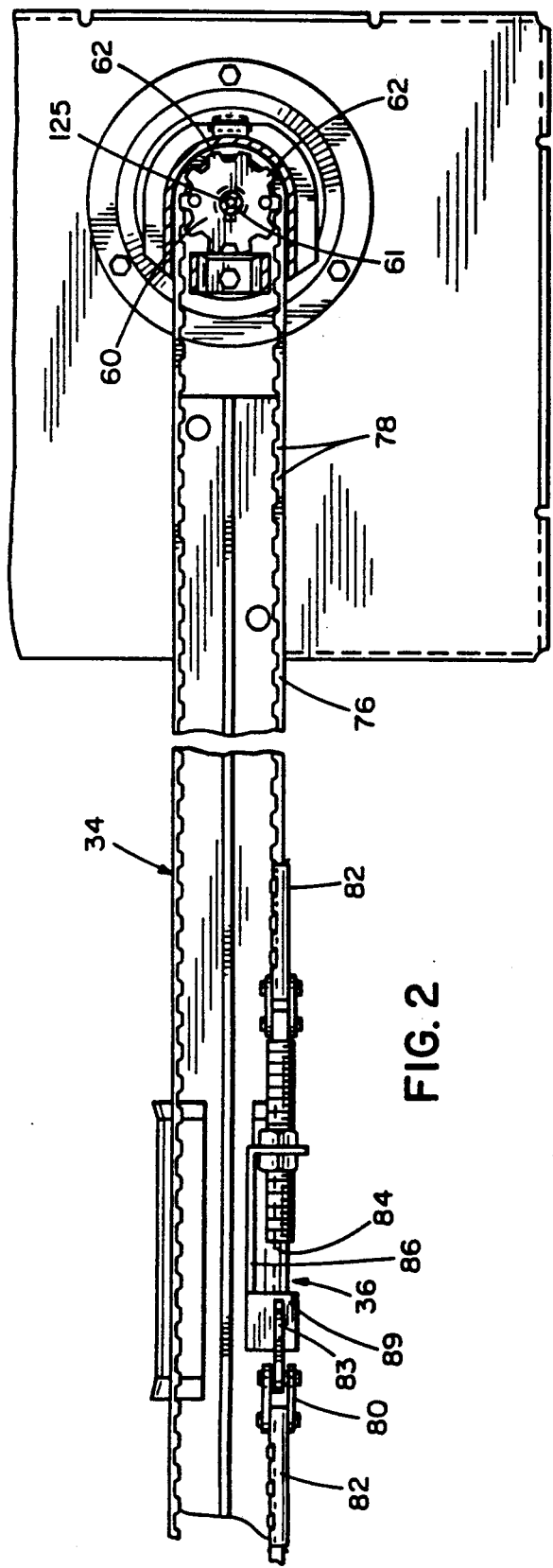
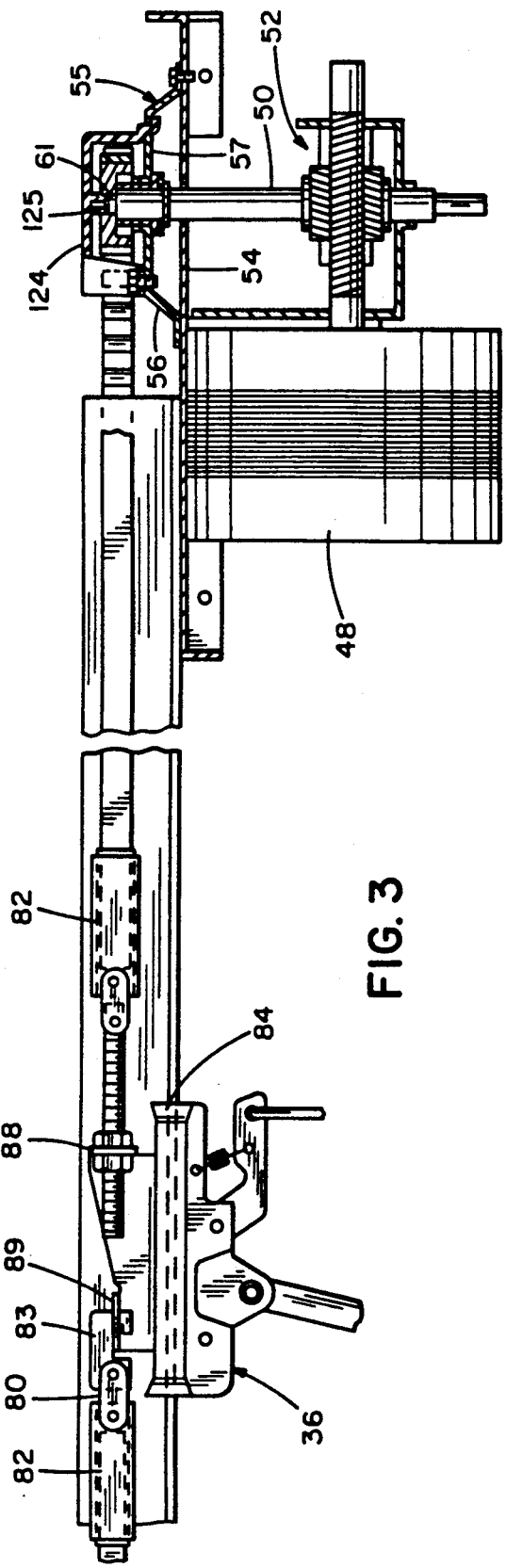
FIG. 2
FIG. 3

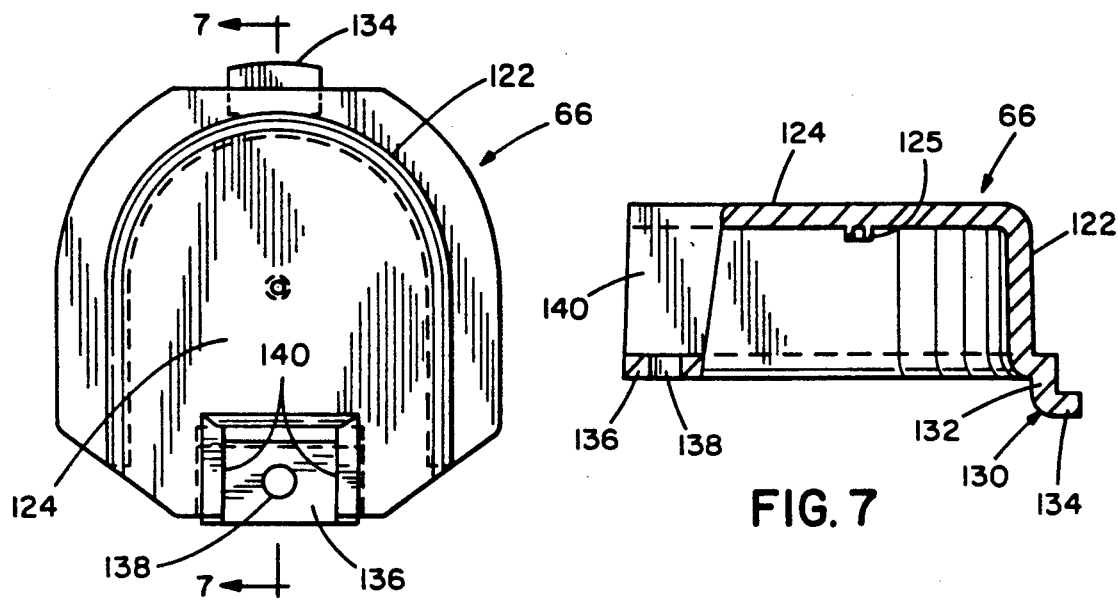
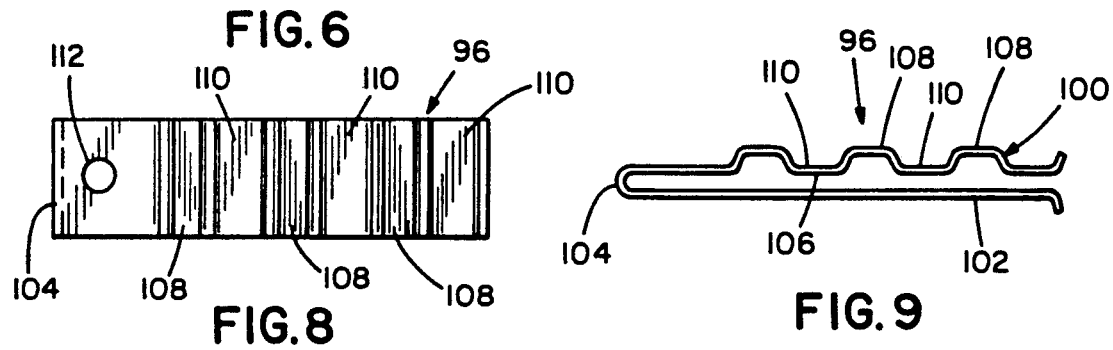
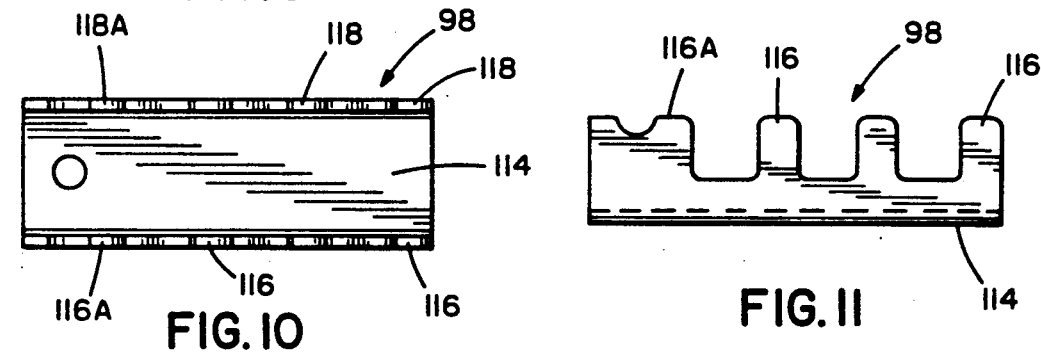
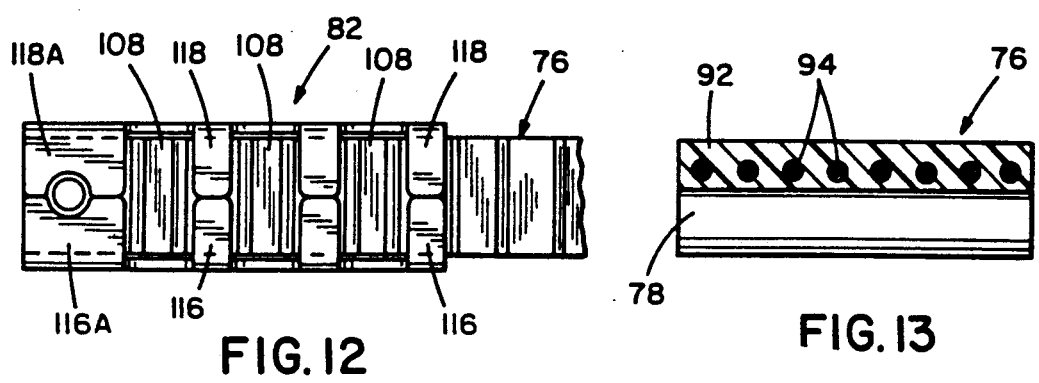

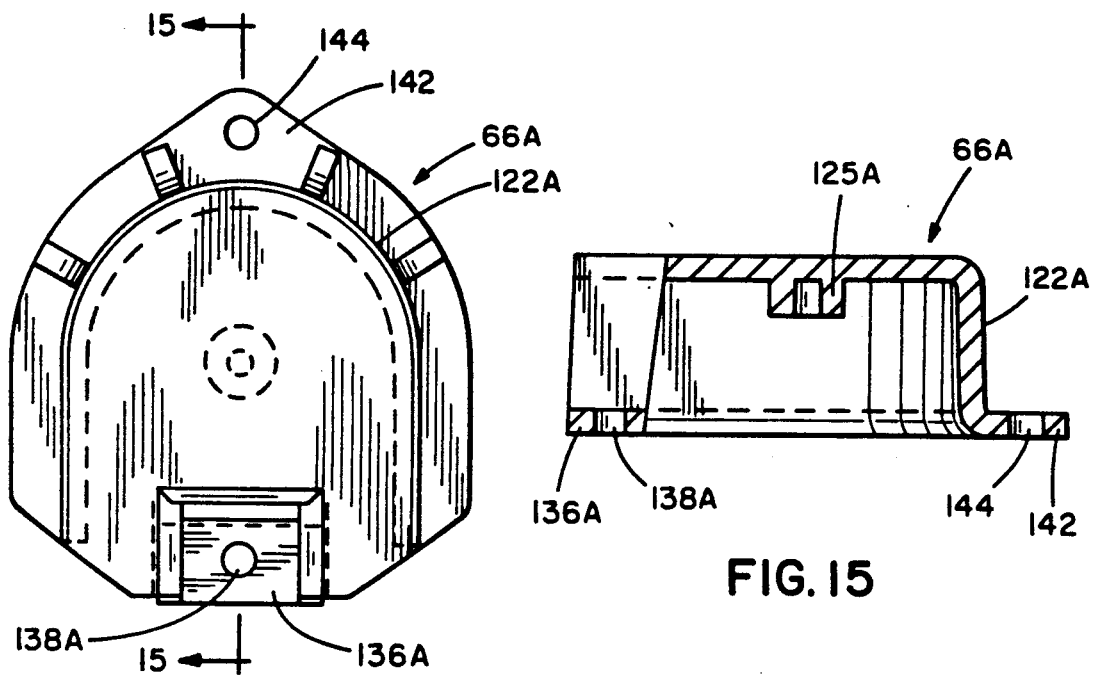
FIG. 14
FIG. 15
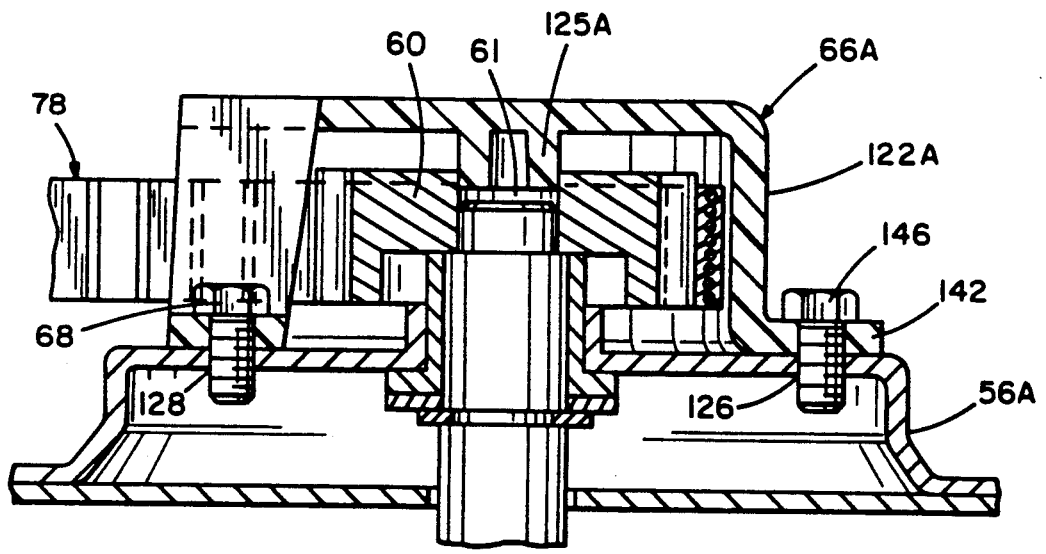
FIG. 16
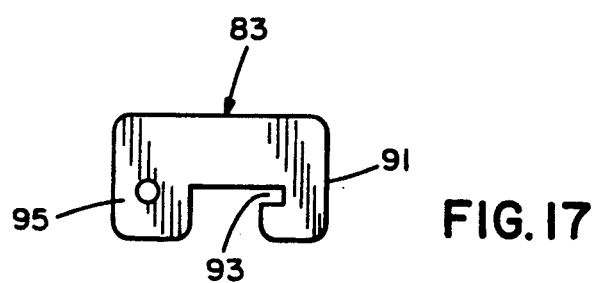
FIG. 17

GARAGE DOOR OPERATOR WITH PLASTIC DRIVE BELT

This invention relates to operators for moving doors between open and closed positions and, more specifically, to such an operator having a drive belt assembly forming a closed loop and including a plastic drive belt.

BACKGROUND OF THE INVENTION

Garage door operators typically include a drive cable assembly trained over a pulley held adjacent the top of the garage door. The assembly often includes a metal chain held by a sprocket at the head unit which includes the motor. While the use of such a chain is generally satisfactory, it is somewhat noisy in operation and is relatively heavy. Furthermore, such a chain drive is difficult to handle during assembly and requires periodic lubrication for optimum performance.

During initial installation, care must be taken to keep the chain taut to avoid kinking. Additionally, because the sprocket teeth must enter the openings formed by the link of the chain, the chain cannot simply be aligned with the sprocket and moved downwardly because the teeth would interfere with the sides of the links. Instead the chain must be pulled past the sprocket teeth and, after alignment, then tightened to pull the chain back into engagement with the sprocket teeth. Simplified installation is always a major objective in a consumer product such as a garage door operator.

Commonly-assigned U.S. Pat. No. 4,885,872, issued Dec. 12, 1989, is directed to a drive belt assembly including a length of reinforced plastic belt having teeth on one side for engaging the teeth on a drive wheel. This patent teaches a connector for joining the belt to other components of the belt assembly, and a shield for holding the belt on the drive wheel. While these components operate satisfactorily, it is always desirable to reduce the number of components, simplify component manufacture, and permit faster assembly and set up of the garage door operator by the installer.

SUMMARY OF THE INVENTION

Among the several aspects and features of the subject invention may be noted the provision of an improved garage door operator. The operator includes a drive belt assembly including a plastic belt portion having teeth for engagement by a toothed drive wheel to provide relatively quiet operation. The belt assembly offers simplified installation as it can be directly moved onto the drive wheel because the wheel teeth do not extend through the plastic belt. Once installed, the belt is prevented from moving out of engagement with the drive wheel. Furthermore, the plastic belt portion is easily joined to other components of the belt assembly without piercing the plastic belt and using a simplified connector having components formed by stamping and bending of metallic blanks. The connector does not require any fasteners to retain the belt end. A belt cap retainer is provided which is easily installed, using only one or two fasteners, after the belt is moved onto the drive wheel. The garage door operator of the present invention is reliable in use, has long service life, and is relatively easy and economical to manufacture. Other objects and features of the invention will be, in part, apparent and, in part, pointed out specifically in the following specification and accompanying drawings.

Briefly, a connector of the present invention for joining an end of a plastic belt having teeth on one surface thereof comprises a clip of one-piece construction. The clip includes a pair of spaced, aligned side walls with one of the side walls having an inside surface with undulations corresponding to the teeth of the plastic belt. The clip further includes an end portion joining first ends of the side walls with the one side wall having an outside surface provided with a plurality of spaced crests with each pair of adjacent crests being separated by a valley. The connector also includes a metallic clip holder of one-piece construction which is generally U-shaped and includes a base wall for engaging the outside surface of the other side wall and two spaced rows of teeth extending away from the base wall which can be deformed to extend into the valleys of the one side wall thereby locking the belt end inside of the retainer.

A belt retainer cap of the present invention functions to prevent the plastic belt after being trained about a drive wheel from moving out of driving engagement with the drive wheel. The retainer is of one-piece thermoplastic construction and includes a central portion defining a cavity for receiving the drive wheel. The central portion includes an arcuate wall for positioning closely adjacent the drive wheel and a ceiling for overlying the drive wheel. In one embodiment, the retainer also includes an anchor adjacent one end of the retainer for extending through an aperture in a wall of a housing of a garage door operator and for extending beneath the material of the wall defining that aperture. In another embodiment, the retainer one end has an extension having a hole for receiving a fastener for extending through the aperture in the housing wall. Both retainer embodiments also include a floor adjacent an opposite end of the retainer having a hole for receiving a fastener for fastening the retainer to the wall of the housing.

BRIEF DESCRIPTION OF THE DRAWINGS

FIG. 2 is a plan view showing components of the operator including a plastic belt, driven by a drive wheel, with one belt end joined to a trolley by means of a connector assembly including a belt clip and a clip connector;

FIG. 3 is a side elevational view of the assembled components shown in FIG. 2, with certain components shown in section;

FIG. 6 is a plan view of the belt retainer cap;

FIG. 7 is a sectional view taken generally along line 7—7 of FIG. 6;

FIG. 8 is a front elevational view of the belt clip;

FIG. 9 is a plan view of the belt clip;

FIG. 10 is a front elevational view of the clip connector before deformation to hold the belt clip;

FIG. 11 is a bottom view of the clip connector before deformation;

FIG. 12 is a front elevational view of the connector assembly installed on the belt end;

FIG. 13 is a transverse cross-sectional view of the plastic drive belt.

FIG. 14, similar to FIG. 6, is a plan view of an alternative embodiment of a belt retainer cap of the present invention;

FIG. 15 is a sectional view taken generally along line 15—15 of FIG. 14;

FIG. 16, similar to FIG. 5, is an enlarged side elevational view, with certain components in section, illustrating the belt retainer cap of FIG. 14 holding the belt in engagement with the drive wheel; and FIG. 17 is a side elevational view of an angle correction clip employed in connection of the trolley to the plastic belt.

Corresponding reference characters indicate corresponding parts throughout the several views of the drawings.

DESCRIPTION OF THE PREFERRED EMBODIMENTS

Figure 1:
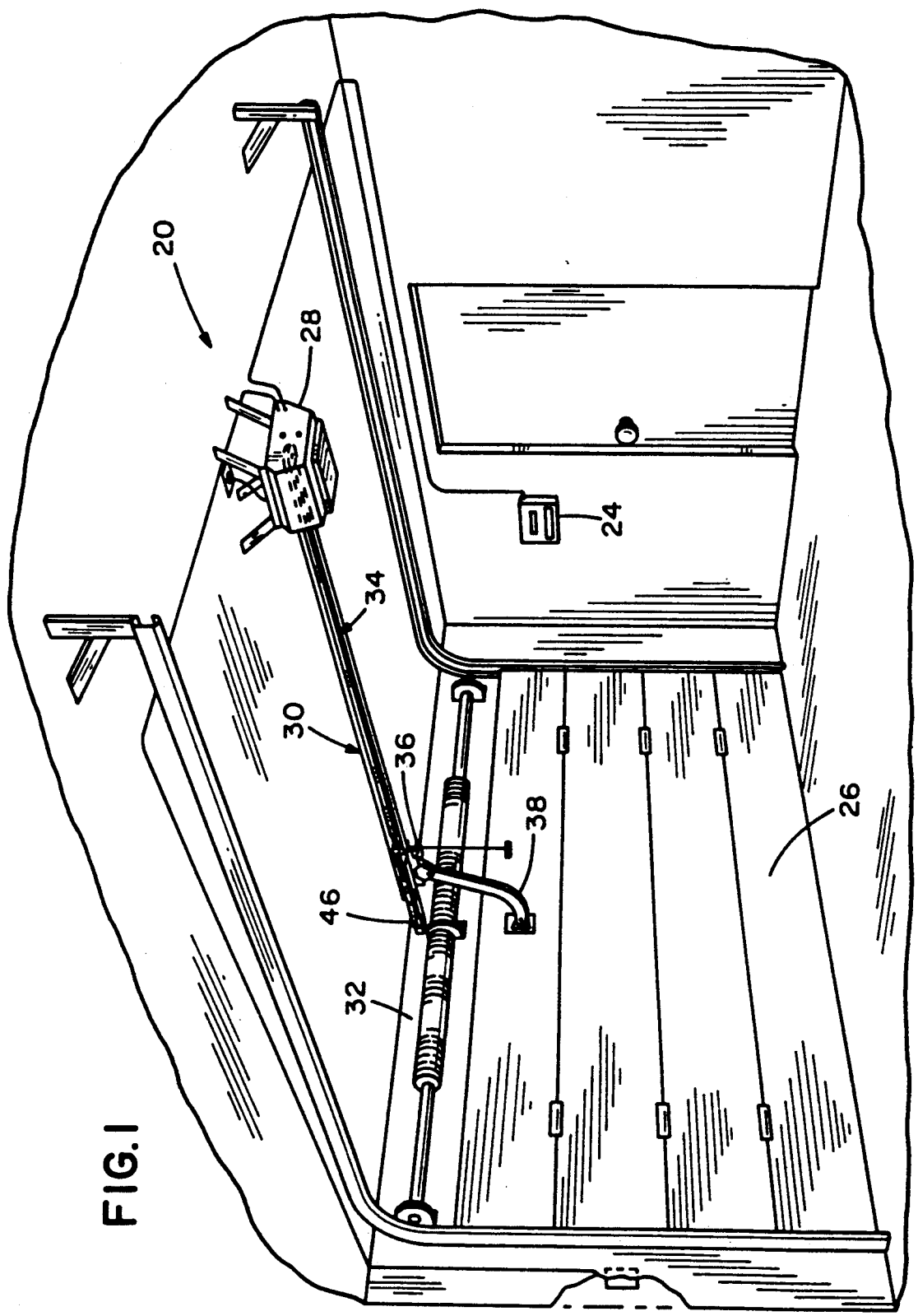
FIG. 1 is a perspective view of a garage door operator embodying various aspects of the present invention.

Referring now to the drawings, a garage door operator embodying various aspects of the present invention is indicated generally in FIG. 1 by reference numeral 20. The operator, the operation of which is controlled by a radio frequency transmitter 22 and/or a wall control 24, functions to move a garage door 26 between open and closed positions. Included in the operator are a head unit 28 for positioning remote from the door 26 on supporting structure such as ceiling joists, an elongate rail assembly 30 extending between the door header 32 and the head unit 28, and a drive belt assembly 34 forming a closed loop and which is supported by the rail assembly and driven by the header unit. The belt assembly 34 includes a trolley 36 which is connected to the door 26 by a curved arm 38.

Figure 4:
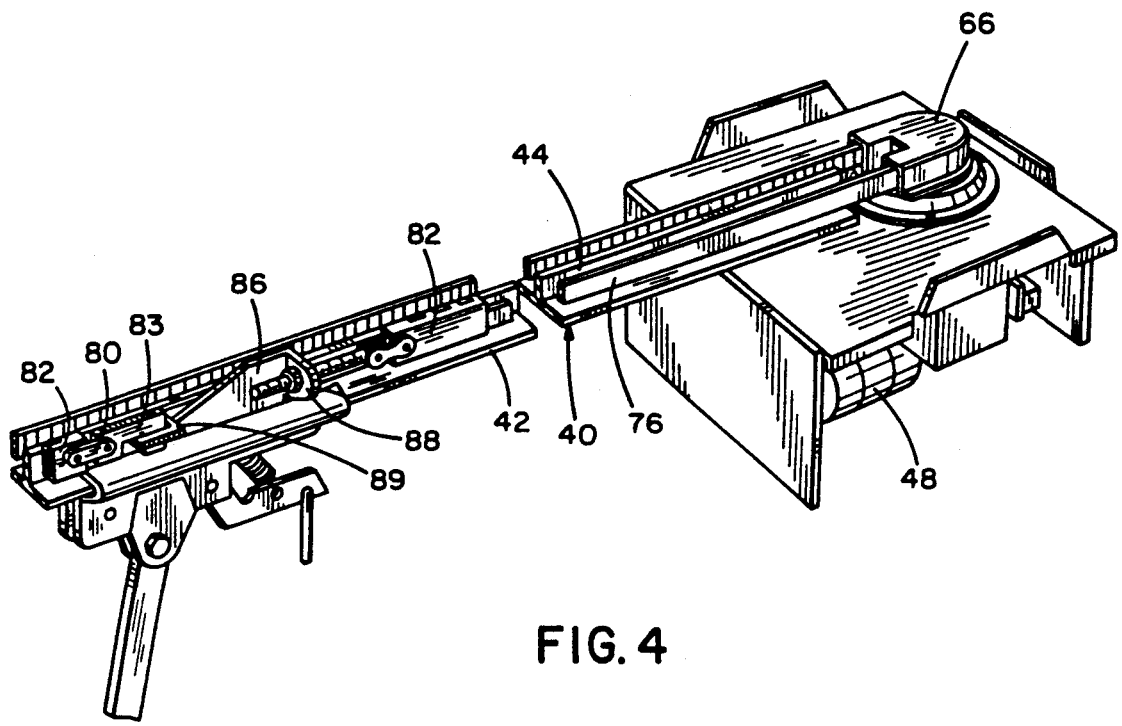
FIG. 4 is a perspective view of the assembled components of FIG. 2, with certain components removed to expose other components.

More specifically, the rail assembly 30 includes a rail 40 in the general shape of an inverted "T" having a horizontal flange 42 and a vertical stiffening wall 44, as best shown in FIG. 4. Referring to FIG. 1, there is a cable pulley 46 positioned at a first end of the rail assembly, while the second end of the rail assembly is held by the head unit 28. The head unit includes a chassis housing a motor 48 which drives an output shaft 50 through a right angle gear arrangement 52, as best shown in FIGS. 3 and 4, along with a radio frequency receiver and associated electronic components for controlling operation of the motor. The chassis has an upper wall means including a top wall 54 and a collar or bearing support 55, mounted on top wall 54, comprising a frustoconical skirt 56 and an upper support wall 57 which holds a collar or bearing 58.

Figure 5:
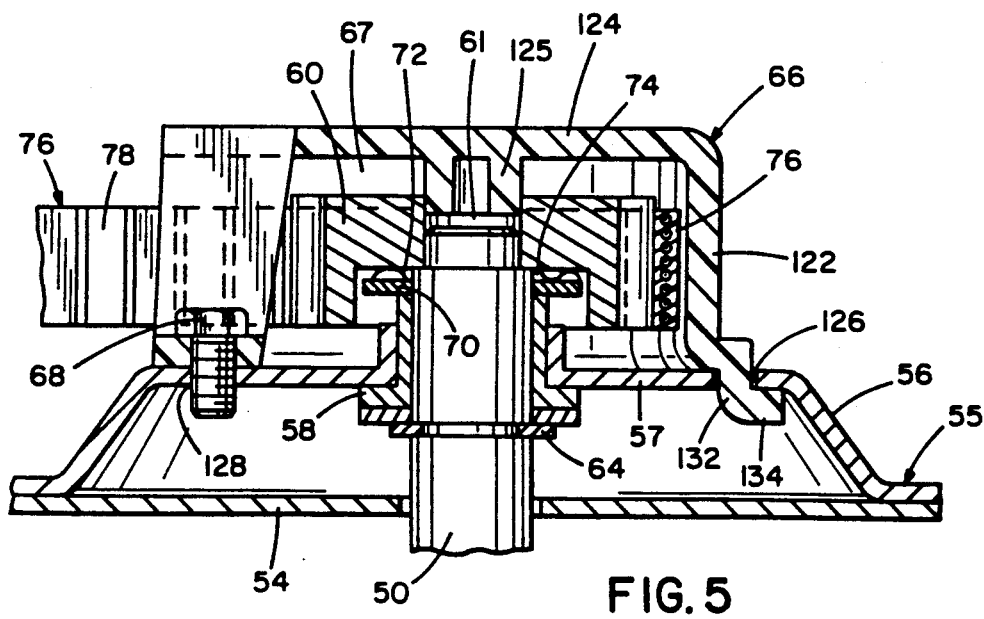
FIG. 5 is an enlarged side elevational view, with certain components in section, illustrating a belt retainer cap for holding the belt in engagement with the drive wheel.

Welded on the output shaft 50, which extends through the top wall and the collar, is a drive wheel 60 having regularly spaced teeth 62 on its periphery. The drive wheel 60, when welded to the shaft, defines a central bore 61. Downward movement of the collar 58 on the shaft 50 is restrained by a lower split ring 64 received in a lower peripheral groove in the output shaft, as shown in FIG. 5. A belt retainer cap 66 defines a cavity 67 receiving the drive wheel 60 and is attached to the upper support wall 57 with a single fastener 68. A washer 70 and a wave spring washer 72 are positioned between the collar and a recessed surface 74 in the wheel 60 to permit limited, restrained movement of the wheel in the axial direction of the output shaft.

Referring to FIG. 4, the drive belt assembly 34 is trained about the drive wheel 60 and the cable pulley 46 in two runs with the stiffening wall 44 of the rail 40 spacing the runs. The belt assembly 34 includes a length of a plastic belt 76 with a plurality of regular spaced teeth 78 on one surface thereof matching the teeth on said drive wheel. The assembly 34 also includes the trolley 36, a first connector 82 joining one end of the plastic belt 76 to one end of the trolley, and a second connector 82, which is identical to the first connector, connecting the second end of the plastic belt to the trolley through an easily assembled chain link 80 and an angle correction link 83.

The trolley 36 may be of conventional design and includes a pair of arms 84 which are inwardly directed and ride on the upper surface of the rail flange 42. One arm 84 has an upstanding wall 86 with a forward transverse mounting tang 88, bent from the plane of the wall 86, having an aperture receiving a tightening bolt assembly 90. The wall 86 also has a rearward horizontal mounting tang 89 having an aperture receiving the forward leg 91 of the link 83, which is shown in FIG. 17. A slot 93 in the leg 91 accepts the tang 89 when the belt assembly is tightened to prevent upward movement of the link 83. The purpose of the link 83 is to provide a vertical mounting wall (the rear leg 95 of the link 83) extending in the direction of the rail. Thus when the chain link 80 joins the leg 95 and the second connector, the belt 76 is in its proper vertical orientation.

The plastic belt 76, as best shown in FIG. 13, includes a web 92 in which a series of transversely spaced, longitudinal extending tension members 94 are embedded. The belt is preferably formed of urethane with high strength steel tension members. Such a plastic belt is available from Freudenberg Industries of Manchester, New Hampshire. The teeth 78 extend the entire width of the belt. Similarly, the teeth 62 of the drive wheel extend the width of the wheel. The head unit operates the drive belt assembly so that the wheel is only contacted by the plastic belt portion 76.

Referring to FIGS. 8–12, the first connector 82 includes a belt clip 96 preferably of one-piece metallic construction (FIGS. 8 and 9) and clip holder 98 also preferably of one-piece metallic (FIGS. 10 and 11). More specifically, the belt clip 96 includes a pair of spaced, aligned side walls 100 and 102 each having a first end and a second end. The clip also includes an arcuate end portion 104 joining the first ends of the side walls. The second ends of the side walls diverge to guide the belt between the side walls. The inside surface of the side wall 100 is undulating, having a trio of crests 106 spaced so as to extend between adjacent plastic belt teeth 78. Side wall 100 has an outside surface with a trio of spaced crests 108 with adjacent crests separated by a valley 110. The first ends of the side walls have aligned apertures 112 for receiving means to join the connector to another component of the belt assembly.

The clip holder 98 is generally U-shaped and includes a base wall 114 for engaging the outside surface of the side wall 102, and two spaced rows of fingers 116 and 118 extending from the base wall. Adjacent fingers in each row are aligned with each other and a corresponding valley 110 of the clip, and are sized to fit in the valley as shown in FIG. 12.

The base wall includes an aperture 120 for alignment with the apertures 112 of the belt clip. Furthermore, the end fingers 116A and 118A of the clip holder are enlarged and include recesses for alignment with the apertures 112 and 120 so that the assembled connector 82, as shown in FIG. !2, includes a tongue having an opening for receiving means to join the connector to another component of the belt assembly.

Operation of the connector is as follows. The end of the plastic belt 76 is inserted into the belt clip 96 so that the inside crests 106 of the inside surface of the side wall 100 extend between the belt teeth 78. The belt clip is then placed in the clip holder 98 so that side wall 102 engages base wall 114. The various fingers 116 and 118 can then be deformed to extend inwardly into the valleys 110 of the belt clip to lock the belt inside of the assembled connector. This finger deformation is accomplished at the factory using an appropriate power deformation tool. It will be appreciated that the belt clip and clip holder are economically and simply manufactured as each can be formed from a steel blank by simply cutting and folding. The belt clip 96 is preferably formed from 22 gauge cold rolled steel, while the clip holder 98 may be formed from HSLA steel. It will be appreciated that installation of the belt 76 and the connector 82 does not require that the belt be pierced by a fastener or in any way damaged which could reduce belt strength.

Referring to FIGS. 6 and 7, the belt retainer cap 66 is of one-piece molded thermoplastic construction, a preferred material being Derlin 100, Derlin is a registered trademark of DuPont for polyacetal resin. The retainer includes a central portion having a first end and a second end and comprising an arcuate wall 122 for positioning closely adjacent the drive wheel 60 opposite the second end of the rail 40 and coplanar with the belt to preclude the belt from moving outwardly away from the drive wheel 60. The spacing between the wheel and the arcuate wall is slightly greater than the web thickness of the plastic belt, and the bight of the belt tensioned about the wheel and the inside surface of the wall 122 have substantially the same curvature. The central portion of the retainer further includes a ceiling 124 for overlying the drive wheel 60 to prevent the installed belt from moving upwardly over the drive wheel. Depending from the ceiling 124 is a centering boss 125 which is received in the drive wheel bore 61.

Referring to FIG. 5, the upper support wall 57 has a first aperture 126 and a second aperture 128 both adjacent the drive wheel 60 and with the drive wheel therebetween. As shown in FIGS. 6 and 7, the retainer 66 also includes an anchor 130 adjacent one end of the central portion for reception in the aperture 126. The anchor includes a dependent finger 132 having at its distal end a nose 134 extending away from the rest of the retainer. After installation, the nose 134 underlies material of the upper support wall 57 defining the aperture. Adjacent the other end of the central portion is a floor 136 having a hole 138 for alignment with second aperture 128 to receive fastener 68 to attach the retainer 66 to the upper support wall 57 of the housing. Joining the floor 136 to the ceiling 124 are a pair of spaced, generally vertically extending struts 140.

Prior to installation of the belt retainer cap 66, the belt assembly 34 is installed on the drive wheel 60. After the plastic belt 76 has been trained around the cable pulley 46 which is provided with teeth matching those of the plastic belt, and the bolt assembly 90 of the trolley 36 is adjusted to permit positioning of the plastic belt portion 76 over the top of the drive wheel with their respective sets of teeth aligned, the plastic belt is merely moved downwardly. It is noted that the upper support wall 57 prevents the belt 76 from moving downwardly below the level of the drive wheel 60. The belt retainer cap 66 is installed by inserting the nose 134 into the aperture 126 and then rotating the retainer 66 until the hole 138 in the floor 136 becomes aligned with the aperture 128. Thereafter, the fastener 68 is tightened to complete installation of the belt retainer cap. The retainer, which is integral, is easily installed and requires the use of only a single fastener. The nose 134 underlying the upper support wall 57 functions to lock one end of the retainer in its installed condition.

An alternative embodiment of the belt retainer cap is shown in FIGS. 14 and 15 by reference character 66A. Components of belt retainer cap 66A corresponding to components of cap 66 are identified by the reference numeral assigned to the component of the cap 66 with the addition of the suffix "A". The chief difference between cap 66A and cap 66 is that anchor 130 of cap 66 is replaced by a horizontal wall 142 having a hole 144 for alignment with the first aperture 126 of the upper support wall 57. When the cap 66A is used, the support wall is preferably slightly reconfigured to permit aperture 126 to be placed outwardly from the arcuate wall 122A of the cap thus providing additional space for the user to insert a second fastener 146 into the aligned hole 144 and aperture 126. Thus the cap 66A is attached to the support wall by two fasteners as opposed to one fastener and an anchor. It should be noted that because cap 66A does not require any rotation in its mounting the centering boss 125A can enter into a close fitting relationship with the drive wheel bore 61. Apart from its mounting by only downward movement and the use of two fasteners, the operation of cap 66A is identical to that of cap 66.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A garage door operator for moving a garage door between an open position and a closed position, said operator comprising:

a head unit for being fixedly held by a supporting structure positioned remote from said door, said head unit including a motor and a drive wheel having spaced teeth on its periphery for being driven by said motor;

elongate rail means having a first end for being fixedly held by a supporting structure disposed adjacent and above said door, said rail means including a pulley located adjacent said first end, said rail means further including a second end for being fixedly held adjacent to and in alignment with said drive wheel; and a drive belt assembly for training about said drive wheel and said pulley in two runs and for being supported by said rail means, said belt assembly including a length of a plastic belt with teeth on one surface thereof matching the teeth on said drive wheel, said belt assembly further including a trolley means for connection to said garage door and a first connector for joining one end of said plastic belt to one end of said trolley means, said plastic belt having a lower surface to which the belt teeth extend, said drive wheel having an upper surface to which the wheel teeth extend, said drive wheel being adapted to engage only said plastic belt component of said belt assembly, said first connector including a belt clip comprising a pair of spaced, aligned side walls, one of said side walls having an inside surface with undulations corresponding to the teeth of said plastic belt, said first connector further including a clip holder deformable from an as-formed position in which said holder can receive said side walls flanking said belt with the belt teeth aligned with said undulations to a deformed position in which said holder firmly holds said side walls with said belt positioned therebetween whereby said belt assembly can be installed by training it around said pulley, moving the plastic belt lower surface over the drive wheel upper surface until their respective teeth are aligned and moving said belt downwardly to train it about said drive wheel.

2. A garage door operator as set forth in claim 1 wherein said belt assembly further includes a second connector for use in joining the other end of said plastic belt to said trolley means.

3. A garage door operator as set forth in claim 2 wherein said first and second connectors are identical.

4. A garage door operator as set forth in claim 1 wherein said one side wall has an outside surface having a plurality of spaced crests with each pair of adjacent crests being separated by a valley.

5. A garage door operator as set forth in claim 4 wherein each of said side walls has a first end and a second end, said clip being integral and including an arcuate end wall joining the first ends of said side walls.

6. A garage door operator as set forth in claim 4 wherein said clip holder is generally U-shaped in its as-formed position and comprises a base wall for engaging the other wall of said belt clip, said clip holder further comprising two spaced rows of fingers extending away from said base wall, adjacent fingers in each row being aligned with each other and a corresponding valley of said clip one side wall outer surface, and being sized to fit in said valley whereby said fingers can be deformed to extend upwardly into said valleys causing said clip to be firmly retained by said holder.

7. A garage door operator as set forth in claim 6 wherein at least one of said clip and holder has a tongue extending from the remainder of said first connector which holds said one end of said belt, said tongue having an opening for receiving means to join the connector to another component of the belt assembly.

8. A garage door operator as set forth in claim 1 wherein said head unit includes a chassis upper wall means, said drive wheel being disposed above the level of said upper wall means, said rail means second end being adapted for mounting on said upper wall means and said upper wall means having a first aperture adjacent to said drive wheel and a second aperture adjacent to said drive wheel, said drive wheel being disposed between said first and second apertures.

9. A garage door operator as set forth in claim 8 further comprising a belt retainer cap for retaining said belt in driving relationship with said drive wheel, said belt retainer cap having a first end and a second end and comprising an arcuate wall for positioning closely adjacent said drive wheel opposite said rail means second end and coplanar with said plastic belt to preclude said belt from moving outwardly away from said drive wheel, a ceiling overlying said drive wheel and of greater diameter than said drive wheel for limiting upward movement of said plastic belt relative to said drive wheel, an anchor adjacent one end of said retainer for reception by said first aperture of said upper wall means, and a floor adjacent the other end of said cap having a hole alignable with said upper wall means second aperture for receiving a fastener to fasten said retainer to said upper wall means.

10. A garage door operator as set forth in claim 9 wherein said belt retainer cap is of one-piece thermoplastic construction.

11. A garage door operator as set forth in claim 9 wherein said anchor includes a dependent finger having at its distal end a nose extending away from the remainder of said cap so that after insertion of said nose into said first aperture, said cap can be rotated until said hole aligns with said second aperture and said nose underlies material of said upper wall means defining said first aperture.

12. A garage door operator as set forth in claim 8 further comprising a belt retainer cap for retaining said belt in driving relationship with said drive wheel, said belt retainer cap having a first end and a second end and comprising an arcuate wall for positioning closely adjacent said drive wheel opposite said rail means second end and coplanar with said plastic belt to preclude said belt from moving outwardly away from said drive wheel, a ceiling overlying said drive wheel and of greater diameter than said drive wheel for limiting upward movement of said plastic belt relative to said drive wheel, an extension adjacent one end of said retainer and having a hole for alignment with said first aperture of said upper wall means so that a first fastener can be received by said hole and aperture, and a floor adjacent the other end of said cap having a second hole alignable with said upper wall means second aperture for receiving a fastener to fasten said retainer to said upper wall means.

13. A garage door operator as set forth in claim 8 wherein said drive wheel has a central bore, and wherein said cap further includes a centering boss dependent from said ceiling for reception in said bore.

14. A connector for joining an end of a plastic belt having teeth on one surface thereof to another component of a drive belt assembly for use in a garage door operator, said connector comprising:

a clip of one-piece construction and including a pair of spaced, aligned side walls, one of said side walls having an inside surface with undulations corresponding to the teeth of said plastic belt, each of said side walls including a first end and a second end, said clip further comprising an end portion joining said first ends of said side walls, said one side wall having an outside surface provided with a plurality of spaced crests with each pair of adjacent crests being separated by a valley; and a metallic clip holder of one-piece construction, said holder being generally U-shaped and comprising a base wall for engaging the outside surface of the other side wall, and two spaced rows of fingers extending away from said base wall, adjacent fingers in each row being aligned with each other and a corresponding valley of said clip one side wall outer surface and being sized to fit in said valley whereby said fingers can be deformed to extend inwardly into said valleys causing said clip to be firmly retained by said holder.

15. A connector as set forth in claim 14 wherein said clip is formed from a metallic blank, and wherein at least one of said clip and holder has a tongue extending from the remainder of said first connector which holds said one end of said belt, said tongue having an opening for receiving means to joint the connector to another component of the belt assembly.

* * * * *

UNITED STATES PATENT AND TRADEMARK OFFICE
CERTIFICATE OF CORRECTION

PATENT NO. : 5,010,688
DATED : April 30, 1991
INVENTOR(S) : Dombrowksi, et al.

It is certified that error appears in the above-identified patent and that said Letters Patent is hereby corrected as shown below:

IN THE ABSTRACT:

At line 16, delete "further".

Column 4, line 68, change "!2" to --12--.

IN THE CLAIMS:

Column 7, line 39, after "clip" insert --and--.
Column 8, line 66, change "joint" to --join--.

Signed and Sealed this

Nineteenth Day of January, 1993

Attest:

DOUGLAS B. COMER

Attesting Officer     Acting Commissioner of Patents and Trademarks